United States Patent [19]

Withem

[11] 4,112,967
[45] Sep. 12, 1978

[54] WEATHERPROOF INSULATED VALVE COVER

[76] Inventor: Ronald Withem, 4030 Payson Dr., La Mesa, Calif. 92041

[21] Appl. No.: 755,246

[22] Filed: Dec. 29, 1976

[51] Int. Cl.$^2$ ............................................. F16L 59/16
[52] U.S. Cl. ................................... 137/375; 138/149; 285/47
[58] Field of Search .................. 137/375; 138/149; 285/47; 428/104, 251, 252

[56] References Cited

U.S. PATENT DOCUMENTS

| | | | |
|---|---|---|---|
| 388,260 | 8/1888 | Carey | 285/47 X |
| 780,843 | 1/1905 | Wallace | 285/47 X |
| 1,108,840 | 8/1914 | Franke | 137/375 |
| 2,778,405 | 1/1957 | Stephens et al. | 285/47 |
| 3,044,915 | 7/1962 | Jacobsen | 137/375 |
| 3,724,491 | 4/1973 | Knudsen et al. | 137/375 |
| 4,009,735 | 3/1977 | Pinsky | 138/149 X |

Primary Examiner—Gerald A. Michalsky
Attorney, Agent, or Firm—Ralph S. Branscomb

[57] ABSTRACT

A valve cover for a pipeline is provided in a flexible multi-layered construction shaped to conform to valves having a stubpipe-type valve stem housing, and having a tough waterproof outer layer of Herculite or the like with one of the inner layers being insulation, the cover being easily removable by virtue of releasable fasteners to permit access to the valve for maintenance.

3 Claims, 5 Drawing Figures

U.S. Patent  Sept. 12, 1978  4,112,967
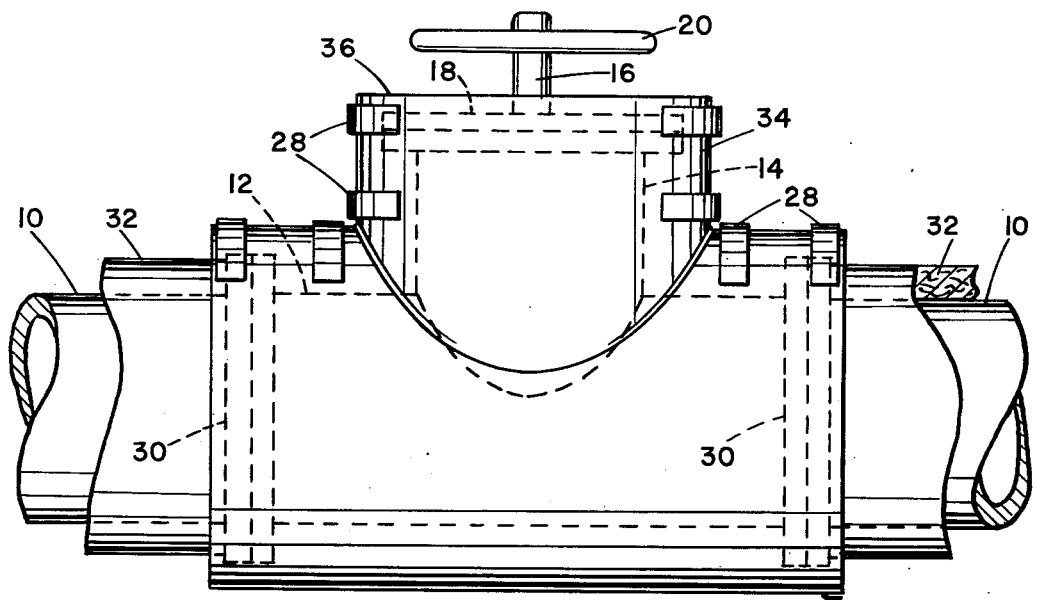
Fig. 1
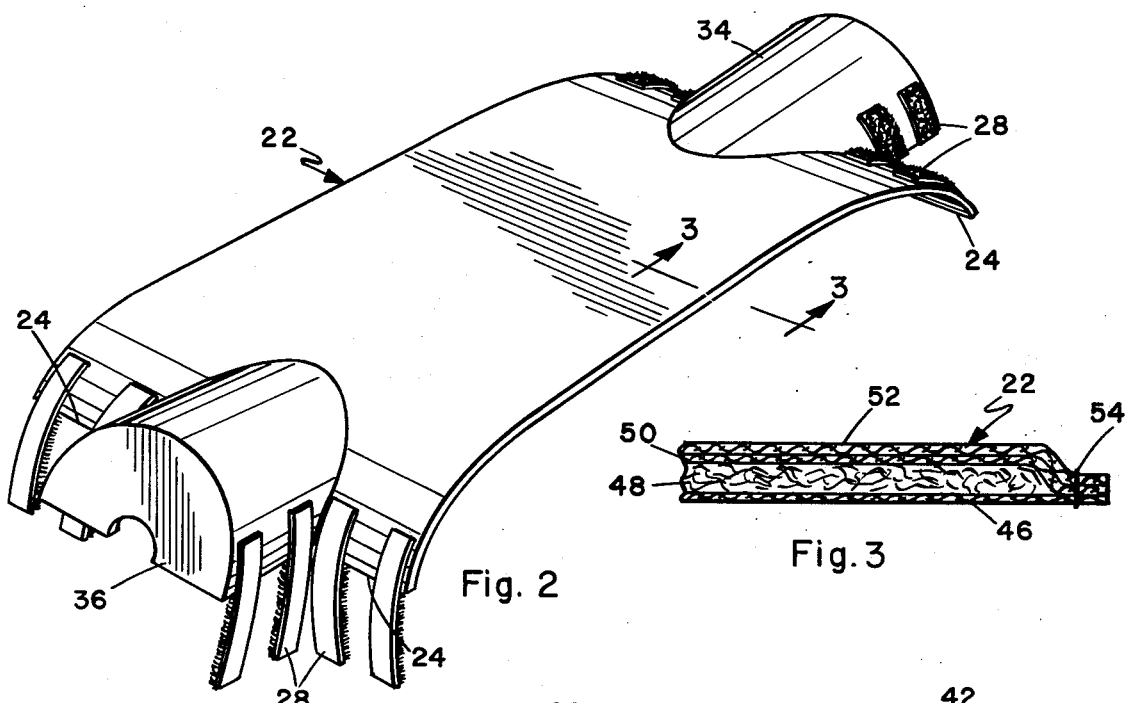
Fig. 2
Fig. 3
Fig. 4
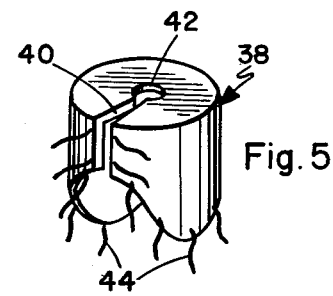
Fig. 5

WEATHERPROOF INSULATED VALVE COVER

BACKGROUND OF THE INVENTION

The present invention is in the field of covers for large valves in pipelines for petroleum, steam works, and elsewhere.

Presently, the most popular type of pipe insulation for indoor use is an asbestos mixture. In outdoor application, of course, weatherproof insulation and coverings must be used on pipes where freezing, heat loss, or other heat transfers might be a problem. A number of different techniques and devices have been developed for covering straight pipe, curved elbows, and other irregularities in the pipeline, and valve housings as well, as is illustrated by U.S. Pat. Nos. 3,495,629, 3,559,694, which show elbow covers, and Pat. Nos. 3,556,158, and 3,724,491, which disclose valve covers. However, there has not been developed a valve cover which combines the advantageous aspects of complete flexibility, lightness in weight, toughness made possible by modern synthetic fabrics, and a waterproof exterior, and the entire cover being simply removable from the valve and reinstallable to permit easy access for maintenance.

SUMMARY OF THE INVENTION

The present valve fulfills the above-mentioned needs and constitutes a valve cover specifically tailored to conform to the type of valve shown. The cover is constructed of a pair of multi-layered sheet members which are wrapped around the main pipeline and the valve stem housing, respectively, and connected by releasable means to define a pair of short orthogonal cylinders which completely cover the valve except for a control wheel. A specific sandwich construction is preferred for the two sheets which comprises two layers of fiberglass or asbestos cloth with insulation therebetween and a fourth external layer of waterproof synthetic, all layers being seamed together at the peripheries of the sheets. Two slightly different embodiments are disclosed, one of which is two pieces and the other being one piece.

BRIEF DESCRIPTION OF THE DRAWINGS

FIG. 1 is a side elevational view of the jacket applied to a typical valve;

FIG. 2 is a perspective view of the one-piece jacket in open position;

FIG. 3 is an enlarged sectional view taken along line 3—3 of FIG. 1;

FIG. 4 is a plan view of the body of an alternative two-piece jacket; and

FIG. 5 is a perspective of the cap portion of the two-piece jacket.

DETAILED DESCRIPTION OF THE PREFERRED EMBODIMENTS

Referring to FIG. 1, a pipeline 10 is shown which connects by flanges to a short length of pipe 12 which serves as the valve housing in a typical valve arrangement. This pipe segment has a standard upright portion 14 which houses the lower portion of valve stem 16 and other structure and terminates in a top plate 18. Typically, the top of the stem 16 mounts a control wheel 20 which is used to operate the valve.

The valve cover of the invention includes a first sheet 22 used to wrap the valve housing 12 as shown in FIG. 1. Essentially, the sheet 22 is rectangular but essentially provided at the mating edges 24 with cut-outs 26, best seen in FIG. 4 to accommodate the cylindrical stem housing 14. Sheet 22 thus forms a cylinder as shown and is fastened in this position by means of Velcro strips and mating pieces 28 in the first embodiment. It can be seen from FIG. 1 that the cylinder thus formed seats on connecting flanges 30 and provides substantial continuity to the permanent pipe insulation 32 covering the straight portions of pipe.

In order to completely cover the valve with the exception of the control wheel, a second sheet 34 is utilized which in the first embodiment is actually two half sheets, each of which is connected to the first sheet around the cut-outs 26 so that together, with the help of additional Velcro fasteners 28, a second cylinder is formed around the stem housing. A circular end piece 36, also split in the first embodiment, covers the top plate 18 of the stem housing in obvious fashion.

It should be clear from a glance at FIG. 2 how the opened-up valve cover shown may be wrapped around the valve as in FIG. 1 to completely enclose all the valve structure except the control wheel.

A slight modification of the first embodiment is shown in FIGS. 4 and 5 wherein the second sheet utilized to form the second cylinder is one piece and has a slot 40 providing access to the central hole 42 to seat the valve stem. Whereas, the first embodiment shown in FIGS. 1 and 2 was a single-piece unit, FIGS. 4 and 5 disclose two separate units representing the first and second sheets and the connectors are twist wires 44. Some advantage is gained in providing two separate pieces inasmuch as the valve stem housing would not necessarily be the same size relative to a particular size pipeline and thus, the two portions could be fit separately.

The fastening means are subjected to variation and could be buckles, clips, belts, or other structure, the important feature being that whatever fastening means is used, it be easily removable to provide access to the valve.

Turning now to FIG. 3, which is common to both embodiments, both sheets, as well as the end piece 36, have a sandwich construction with an inner layer 46 of fiberglass or asbestos heat-resistant cloth, a next layer of insulation which is preferably glass wool, another layer 50 of fiberglass or asbestos cloth, and an outer layer 52 of a tough waterproof material. A synthetic material trademarked Herculite has been found quite satisfactory for layer 52 in that it is extremely strong as well as waterproof. These sandwich sheets 22 and 34 are seamed around the edges as at 54 and then sewn together according to whichever embodiment is used.

Insulating blankets utilizing this sandwich construction could be used in other configurations to cover other outdoor joints, pipes, valves, etc. where design requirements include strength, weatherproofing, flexibility and lightness of weight.

Thus, the invention as shown clearly provides a valve cover having the desired advantages over existing covers of economy, lightness of weight, flexibility, which effects ease of installation, as well as transportation, a completely waterproof and insulated configuration and the cover is removable in seconds for easy maintenance.

I claim:

1. A removable, two-piece flexible, pre-fitted, water repellant insulated cover for a pipeline valve having a projecting stem connected to a control wheel and a stem housing enclosing a portion of said stem, said cover comprising:
  (a) a first flexible sheet to cover portions of said pipeline adjacent said valve stem, said sheet having two edges which mate to define a cylinder around said pipe and said edges defining arcuate mating cutouts to define an opening for the protrusion of said valve stem housing through the cylinder defined by said sheet;
  (b) a second separate flexible sheet removably attached to said first sheet along the cutouts in the edges thereof to cover said stem housing and having a flexible end piece with a hole therein to pass said stem therethrough;
  (c) releasable twist wires provided in both sheets for fastening said second sheet to itself around said valve stem housing and to said first sheet and for fastening said first sheet to itself around said pipeline; and
  (d) each of said sheets being multi-layered and having an insulating layer and a tough, inextensible, flexible, weatherproof, waterproof outer layer, whereby a pipeline valve may be effortlessly sealed from the elements by said valve cover and easily exposed for maintenance.

2. Structure according to claim 1 wherein said second sheet is a single piece and is removably attached to said first sheet.

3. Structure according to claim 1 wherein the outer layer of each of said sheets is composed of a tough, inextensible, flexible, watertight sheetmember.

* * * * *